United States Patent
Marstatt

(10) Patent No.: US 9,409,831 B2
(45) Date of Patent: Aug. 9, 2016

(54) GAS GENERATOR ASSEMBLY FOR AN AIRBAG MODULE

(71) Applicant: Takata AG, Aschaffenburg (DE)

(72) Inventor: Dieter Marstatt, Großostheim (DE)

(73) Assignee: Takata AG (DE)

( * ) Notice: Subject to any disclaimer, the term of this patent is extended or adjusted under 35 U.S.C. 154(b) by 0 days.

(21) Appl. No.: 14/626,486

(22) Filed: Feb. 19, 2015

(65) Prior Publication Data

US 2015/0239425 A1 Aug. 27, 2015

(30) Foreign Application Priority Data

Feb. 21, 2014 (DE) .......................... 10 2014 203 170

(51) Int. Cl.
*C06D 5/00* (2006.01)
*B60R 21/264* (2006.01)
*B60R 21/26* (2011.01)

(52) U.S. Cl.
CPC .............. *C06D 5/00* (2013.01); *B60R 21/2646* (2013.01); *B60R 2021/26011* (2013.01)

(58) Field of Classification Search
CPC ............. B60R 21/2644; B60R 21/264; B60R 21/2646; B60R 21/2648
USPC ......................................................... 280/741
See application file for complete search history.

(56) References Cited

U.S. PATENT DOCUMENTS

| 4,249,673 | A | | 2/1981 | Katoh et al. |
| 5,478,112 | A | * | 12/1995 | Knobloch ................. F16B 5/00 102/531 |
| 5,611,566 | A | | 3/1997 | Simon et al. |
| 5,636,865 | A | * | 6/1997 | Riley ................... B60R 21/2644 280/728.2 |
| 2001/0020778 | A1 | | 9/2001 | Unterforsthuber et al. |
| 2003/0025313 | A1 | * | 2/2003 | Sawa .................. B60R 21/2644 280/741 |
| 2007/0210567 | A1 | * | 9/2007 | Krupp ................. B60R 21/2644 280/736 |

FOREIGN PATENT DOCUMENTS

WO    WO 2007/018358    *   2/2007

* cited by examiner

*Primary Examiner* — Stephen M Johnson
(74) *Attorney, Agent, or Firm* — L.C. Begin & Associates, PLLC.

(57) ABSTRACT

The invention relates to a gas generator assembly for an airbag module of a motor vehicle, which is equipped for inflating a gas bag of the airbag module. The gas generator assembly comprises a generator housing, with a gas set arranged in the generator housing, from which a gas can be generated on ignition, an ignition device for igniting the gas bag, a volume compensating element which acts on the gas set under elastic pretension and which is designed as spring element, and a filter for filtering gases generated by means of the gas set, which are released from the generator housing. The volume compensating element is formed of a filter material and is arranged in the generator housing such that gases generated in the generator housing are filtered by the volume compensating element, before they exit from the generator housing.

12 Claims, 2 Drawing Sheets

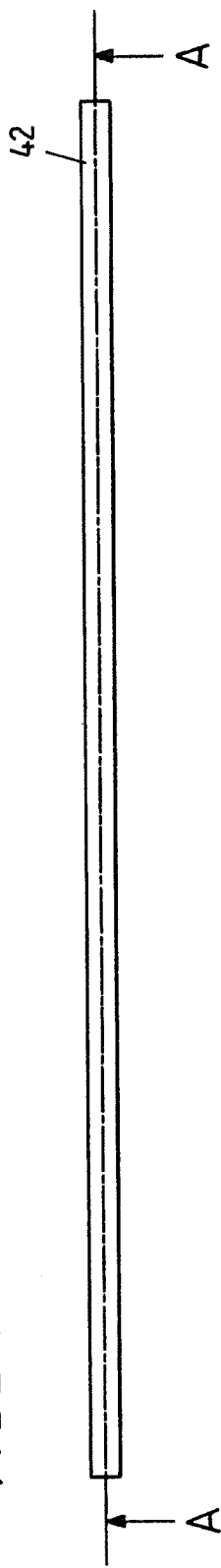
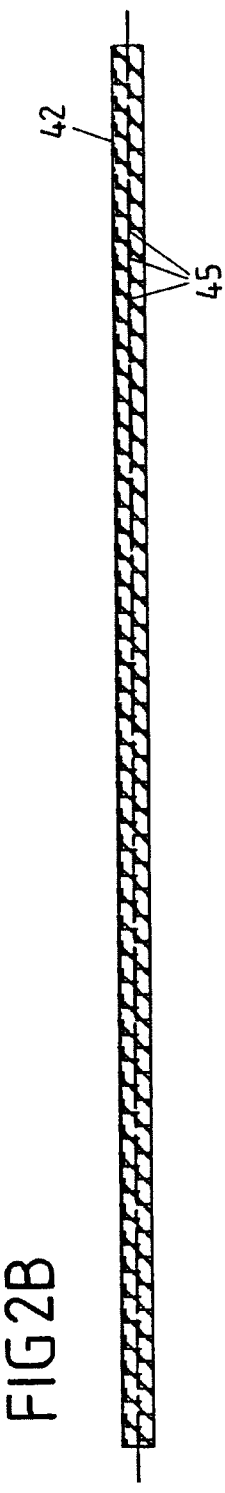
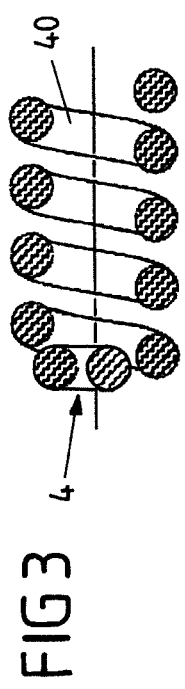
FIG 2A
FIG 2B
FIG 3

GAS GENERATOR ASSEMBLY FOR AN AIRBAG MODULE

CROSS-REFERENCE TO RELATED APPLICATION

This application claims priority to German Patent Application No. 10 2013 203 170.2 filed on Feb. 21, 2014, the entirety of which is incorporated by reference herein.

BACKGROUND

This invention relates to a gas generator assembly of an airbag module for a motor vehicle.

Such gas generator assembly is equipped for inflating a gas bag of an airbag module and for this purpose comprises a gas generator housing and a gas set arranged in the generator housing, e.g. a gas-generating solids charge in tablet form, from which a gas can be generated on ignition by means of an ignition device. There is furthermore provided a volume compensating element which acts on the gas set under elastic pretension. The elastic volume compensating element serves to fill that space in the generator housing which is not taken by the gas set or the pyrotechnical charge. The gases generated on ignition of the gas set are filtered by means of a filter provided in the generator housing, before the same are released from the generator housing for inflating a gas bag.

Such gas generator assembly for an airbag module is known from U.S. Pat. No. 5,636,865. In that gas generator a filter arranged within the tubular generator housing annularly surrounds a gas set, so that the gases generated on ignition of the gas set first pass through the filter, before they can exit through outlet openings in the wall of the generator housing. There is furthermore provided a volume compensating element formed as spiral or coil spring, which is arranged within the generator housing in the region of the igniter of the gas generator and acts on the gas set under pretension. Such gas generator assembly is expensive to manufacture due to the plurality of different components. Furthermore, the volume compensating element arranged in the region of the igniter can influence the ignition behavior of the gas set.

SUMMARY

It is a problem underlying the invention to further improve a gas generator assembly as mentioned above, in particular by eliminating the aforementioned disadvantages.

According to the invention, this problem is solved by creating a gas generator assembly with the features as described herein.

Accordingly, the volume compensating element is formed by a filter material and arranged in the generator housing such that the gases to be released from the generator housing on ignition of the gas set are filtered in the volume compensating element.

By combining the volume compensating element on the one hand and the filter on the other hand to one component, not only the number of components of the gas generator assembly is reduced, but it can also be avoided that the ignition behavior of the gas set is influenced by the volume compensating element which in the prior art is to be arranged separate from the filter.

The volume compensating element can form the only filter for the gases to be released from the generator housing.

For releasing the gases generated on ignition of the gas set, the generator housing includes at least one outflow opening, in particular a plurality of outflow openings. The volume compensating element (with additional filter function) advantageously is arranged such that it covers or closes the outflow opening(s), so that the gases generated in the generator housing pass through the volume compensating element, before they can be released through the outlet openings.

As filter material, for example a wire, in particular a spring steel wire can be used. To form a filter, the same can have been knitted, woven, braided or processed in a corresponding way.

The volume compensating element is formed by a spring, in particular in the form of a spiral or coil spring. The spring on the one hand acts on the gas set under pretension and on the other hand covers the outlet openings of the generator housing with its windings (made of filter material), so that gases exiting from the generator housing are filtered, before they are released into the surroundings.

Concretely, the spring element can be wound from a filter cord, which in turn has been knitted, woven, braided or manufactured in a comparable way of spring steel wire.

The volume compensating element (at the same time acting as filter) advantageously is arranged in the generator housing such that it acts on a side of the gas set facing away from the ignition device. The volume compensating element thereby does not influence the ignition of the gas set.

In a tubular generator housing, for example, the ignition device can be arranged at an axial end portion and the volume compensating element can be arranged at the other axial end portion of the generator housing. Inbetween, the gas set is accommodated within the generator housing.

BRIEF DESCRIPTION OF THE DRAWINGS

Further details and advantages of the invention will become apparent from the following description of an exemplary embodiment.

FIG. 2A shows a filter cord for forming the volume compensating element of FIG. 1A or 1B.

FIG. 2B shows a cross-section through the filter cord of FIG. 2A.

FIG. 3 shows a volume compensating element wound from the filter cord according to FIGS. 2A and 2B.

DETAILED DESCRIPTION

Figure 1A:
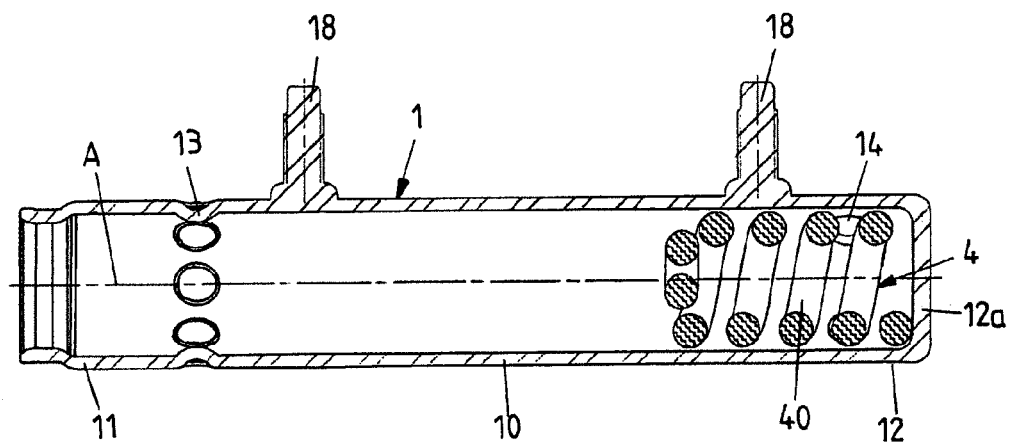
FIG. 1A shows a cross-section through a generator housing with a volume compensating element arranged therein.
Figure 1B:
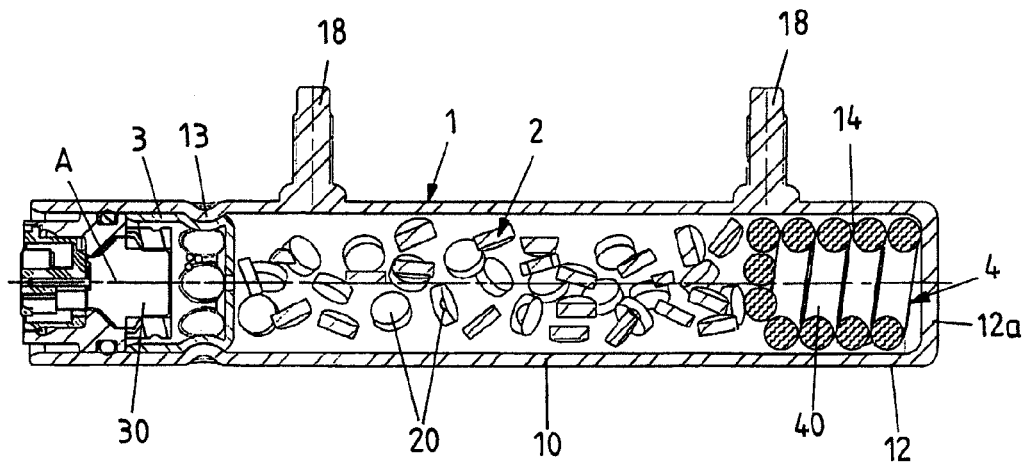
FIG. 1B shows the generator housing of FIG. 1A, wherein a gas set and an ignition device for igniting the gas set furthermore are provided in the generator housing.

FIGS. 1A and 1B show a generator housing 1 for a gas generator for inflating a gas bag of an airbag module, each in cross-section. FIG. 1A furthermore shows a volume compensating element 4 in the form of a coil or spiral spring in the relaxed state, which is arranged within the generator housing 1. In addition to the volume compensating element 4, FIG. 1B shows a gas set 2 arranged within the generator housing 1, from which on ignition a gas serving for inflating a gas bag can be generated, and an ignition device 3 for igniting the gas set 2.

In the exemplary embodiment, the generator housing 1 is designed tubular with a boundary wall 10 which extends from a first axial end portion 11 to a second axial end portion 12 of the generator housing. At the first axial end portion 11 of the generator housing 1 the ignition device 3 including an igniter 30 is fixed by means of impressions 13. At the other axial end portion 12, the volume compensating element 4 in the form of a coil or spiral spring is arranged, which there supports on a bottom 12a of the generator housing 1.

The space within the generator housing 1 between the ignition device 3 and the volume compensating element 4 is filled with a gas set 2. In the exemplary embodiment, the same consists of a plurality of tablet-shaped elements 20 (solids charge). The volume compensating element 4 acts on the gas set 2 under pretension (namely on its side facing away from the ignition device 3), so that an interior space defined by the generator housing 1 beyond the ignition device 3 is completely filled by the gas set 2 and the volume compensating element 4.

According to FIG. 1B, the volume compensating element 4 is compressed in the generator housing 1 in the proper presence of the gas set 2 such that (with its spring windings 40) it covers or closes outflow openings 14 provided at the generator housing wall 10. In the exemplary embodiment, the volume compensating element 4 or its spring windings 40 are made of a filter material. Gases generated on ignition of the gas set 2 (by means of the ignition device 3) therefore initially pass through the spring windings 40 of the volume compensating element 4 acting as filter, before they can be released through the outlet openings 14 for inflating a gas bag. The volume compensating element 4 thus assumes the additional function of a filter.

Since the volume compensating element 4 substantially is spaced from the ignition device 3 along the tube axis A of the generator housing 1 and in the exemplary embodiment concretely is arranged on the side of the gas set 2 facing away from the ignition device 3, the ignition behavior of the gas set 2 is not impaired by the presence of the volume compensating element 4.

FIGS. 1A and 1B furthermore reveal fastening elements 18 provided at the generator housing 1, via which the gas generator can be attached to further components of an airbag module or a motor vehicle.

FIGS. 2A and 2B show a filter cord 42 of which the spring windings 40 of the volume compensating element 4 shown in FIGS. 1A and 1B can be made. The filter cord 42 is formed by spring steel wire, which for this purpose has been knitted, woven, braided or processed in a comparable way to form a cord. The spring windings 40 of the volume compensating element 4 acting as filter serve as retaining means for burn-off products from the ignition of the gas set 2 (such as for example solids, suspended particles, slag and/or particles), for cooling the generated gas and/or for the reduction of harmful gases (e.g. by use of a catalytically acting material). By changing manufacturing parameters such as e.g. the wire diameter, the wire material, the wire length and/or the filter density, different variants of the volume compensating element 4 easily can be manufactured.

FIG. 3 again shows the volume compensating element 4 of FIGS. 1A and 1B, whose spring windings 40 are wound from a filter cord of the type shown in FIGS. 2A and 2B.

The invention claimed is:

1. A gas generator assembly for an airbag module of a motor vehicle, which is equipped for inflating a gas bag of the airbag module, comprising
a generator housing,
a gas generating material arranged in the generator housing, from which a gas can be generated on ignition,
an ignition device for igniting the gas generating material,
a volume compensating element in form of a coil spring or a spiral spring comprising spring windings which acts on the gas generating material under elastic pretension, and
a filter material for filtering gases generated by activation of said gas generating material, which are released from the generator housing,
wherein the spring windings of said volume compensating element are formed of said filter material, and
wherein said volume compensating element is arranged in the generator housing such that gases generated in the generator housing are filtered by the spring windings of said volume compensating element, before they exit from the generator housing.

2. The gas generator assembly according to claim 1, wherein the volume compensating element forms the only component provided within the generator housing for filtering gases generated therein.

3. The gas generator assembly according to claim 1, wherein in a wall of the generator housing outflow openings are provided for releasing gases generated in the generator housing.

4. The gas generator assembly according to claim 3, wherein the volume compensating element covers the outflow openings.

5. The gas generator assembly according to claim 4, wherein the volume compensating element closes the outflow openings such that gases generated in the generator housing pass through the filter material of the volume compensating element, before they are released through the outflow openings.

6. The gas generator assembly according to claim 1, wherein the filter material of the volume compensating element is formed by wire.

7. The gas generator assembly according to claim 6, wherein the filter material of the volume compensating element is formed by spring steel wire.

8. The gas generator assembly according to claim 6, wherein the wire is knitted, woven or braided.

9. The gas generator assembly according to claim 1, wherein the volume compensating element acts on a side of the gas generating material facing away from the ignition device.

10. The gas generator assembly according to claim 1, wherein the generator housing is formed tubular.

11. The gas generator assembly according to claim 10, wherein the ignition device is arranged on a first axial end portion of the generator housing and the volume compensating element is arranged on the other axial end portion of the generator housing.

12. The gas generator assembly according to claim 11, wherein the gas generating material is provided in the generator housing in axial direction between the ignition device and the volume compensating element.

* * * * *